(12) United States Patent
Traynor et al.

(10) Patent No.: US 12,229,800 B2
(45) Date of Patent: Feb. 18, 2025

(54) AUGMENTED REALITY GUEST RECOGNITION SYSTEMS AND METHODS

(71) Applicant: Universal City Studios LLC, Universal City, CA (US)

(72) Inventors: Mark James Traynor, Orlando, FL (US); David John-Louis Alter, Orlando, FL (US); Kyle Patrick Hanley, Orlando, FL (US); Jeffrey Lamar Polk, Winter Garden, FL (US); Brett James Conroy, Orlando, FL (US); Bonnie Jean Spivey, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 132 days.

(21) Appl. No.: 17/180,551

(22) Filed: Feb. 19, 2021

(65) Prior Publication Data

US 2021/0271881 A1    Sep. 2, 2021

Related U.S. Application Data

(60) Provisional application No. 62/982,528, filed on Feb. 27, 2020.

(51) Int. Cl.
*G06F 18/22* (2023.01)
*G02B 27/01* (2006.01)
(Continued)

(52) U.S. Cl.
CPC ..... *G06Q 30/0251* (2013.01); *G02B 27/0172* (2013.01); *G06F 18/22* (2023.01);
(Continued)

(58) Field of Classification Search
None
See application file for complete search history.

(56) References Cited

U.S. PATENT DOCUMENTS

| 8,438,110 B2 | 5/2013 | Calman et al. |
| 9,028,325 B2 | 5/2015 | Paquet |

(Continued)

FOREIGN PATENT DOCUMENTS

| KR | 20140136288 A | 11/2014 |
| WO | 2019082687 A1 | 5/2019 |

OTHER PUBLICATIONS

Ellis, Cat, "How augmented reality could transform the lives of people with face blindness," TechRadar, Oct. 16, 2018, 12 pgs., https://www.techradar.com/news/how-augmented reality-could-transform-the-lives-of-people-with-face-blindness.

(Continued)

*Primary Examiner* — Hilina K Demeter
(74) *Attorney, Agent, or Firm* — Fletcher Yoder P.C.

(57) ABSTRACT

Systems and methods presented herein include a venue system that includes a guest recognition system configured to recognize one or more guests in a venue, and a guest experience analysis system configured to receive data relating to the recognized one or more guests from the guest recognition system, to generate guest experience information relating to the recognized one or more guests based at least in part on the received data relating to the recognized one or more guests, and to transmit the guest experience information relating to the recognized one or more guests to an augmented reality display device for display on an augmented reality display of the augmented reality display device.

22 Claims, 5 Drawing Sheets

(51) Int. Cl.
  *G06Q 30/0251* (2023.01)
  *G06Q 30/0282* (2023.01)
  *G06V 20/20* (2022.01)
  *G06V 20/52* (2022.01)
  *G06V 40/10* (2022.01)
  *G06V 40/16* (2022.01)
  *G06V 40/20* (2022.01)

(52) U.S. Cl.
  CPC ......... *G06Q 30/0282* (2013.01); *G06V 20/20* (2022.01); *G06V 20/52* (2022.01); *G06V 40/10* (2022.01); *G06V 40/103* (2022.01); *G06V 40/16* (2022.01); *G06V 40/172* (2022.01); *G06V 40/20* (2022.01); *G06V 40/25* (2022.01); *G02B 2027/0178* (2013.01)

(56) References Cited

U.S. PATENT DOCUMENTS

| | | | |
|---|---|---|---|
| 2010/0130296 A1 | 5/2010 | Ackley et al. | |
| 2013/0018661 A1* | 1/2013 | Padgett | G06Q 10/06 705/1.1 |
| 2013/0083003 A1* | 4/2013 | Perez | A63F 13/216 345/419 |
| 2013/0147686 A1* | 6/2013 | Clavin | G02B 27/017 345/8 |
| 2014/0192085 A1 | 7/2014 | Kim | |
| 2015/0178558 A1* | 6/2015 | Sako | G06V 40/10 382/103 |
| 2015/0294322 A1 | 10/2015 | Grigg et al. | |
| 2016/0026253 A1* | 1/2016 | Bradski | H04N 13/128 345/8 |
| 2017/0351909 A1 | 12/2017 | Kaehler | |
| 2018/0040044 A1 | 2/2018 | Mattingly et al. | |
| 2018/0129984 A1* | 5/2018 | Polk | A63G 31/00 |
| 2018/0250589 A1 | 9/2018 | Cossairt et al. | |
| 2018/0255285 A1* | 9/2018 | Hall | A63G 7/00 |
| 2018/0284453 A1* | 10/2018 | Irvin | G06T 19/006 |
| 2018/0350171 A1* | 12/2018 | Weston | G07C 9/37 |
| 2019/0206132 A1 | 7/2019 | Zielkowski | |
| 2019/0258313 A1* | 8/2019 | Sun | G06V 40/176 |

OTHER PUBLICATIONS

Morozova, Anastasia, "Commercial use Cases of AR Face Recognition and Facial Tracking Apps," Jasoren, 15 pgs, retrieved Feb. 19, 2021, https://jasoren.com/commercial-use-cases-of-ar-face-recognition-and-facial-tracking-apps/.

Starner, Thad et al., "Augmented Reality Through Wearable Computing," The Media Laboratory, Massachusetts Institute of Technology, 24 pgs.

PCT/US2021/019594 International Search Report and Written Opinion mailed Jun. 11, 2021.

JP Office Action for Japanese Application No. 2022-551705 mailed Sep. 2, 2024.

AE Office Action for United Arab Emirates Application No. P6001652/22 mailed Nov. 23, 2024.

* cited by examiner

AUGMENTED REALITY GUEST RECOGNITION SYSTEMS AND METHODS

CROSS-REFERENCE TO RELATED APPLICATION

This application claims priority to and the benefit of U.S. Provisional Application No. 62/982,528, entitled "Augmented Reality Guest Recognition Systems and Methods," filed Feb. 27, 2020, which is hereby incorporated by reference in its entirety for all purposes.

FIELD OF DISCLOSURE

The present disclosure relates generally to systems and methods for the creation of an augmented reality environment that facilitates employees of a venue (e.g., an amusement or theme park) to enhance the experiences of guests of the venue. More specifically, embodiments of the present disclosure relate generally to systems and methods for an augmented reality environment based on automated recognition of guests of the venue.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and/or theme parks may include various entertainment attractions, restaurants, souvenir shops, and rides useful in providing enjoyment to guests (e.g., families and/or people of all ages) of the venue. Areas of the venue may have different themes that are specifically targeted to certain audiences. For example, certain areas may include themes that are traditionally of interest to children, while other areas may include themes that are traditionally of interest to more mature audiences. Generally, locations having themes associated with such a venue may be referred to as an attraction or a themed attraction. These themed attractions may be established using fixed equipment, building layouts, props, decorations, and so forth, most of which may generally relate to a certain theme. In general, employees of the venue may help enhance the experiences of the guests. As such, the employees of the venue may be assisted with more up-to-date information relating to the previous and current states of the experiences of the guests in order to enhance the future experiences of the guests.

It is now recognized that it is desirable to include themed attractions where it may be possible to change the environments of the themed attractions in a flexible and efficient manner, relative to traditional techniques. It is also now recognized that it may be desirable to enhance the immersive experience of guests for such themed attractions, and to provide a more personalized or customized experience for guests.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, a system includes a guest recognition system configured to recognize one or more guests in a venue. The system also includes a guest experience analysis system configured to receive data relating to the recognized one or more guests from the guest recognition system, to generate guest experience information relating to the recognized one or more guests based at least in part on the received data relating to the recognized one or more guests, and to transmit the guest experience information relating to the recognized one or more guests to an augmented reality display device for display on an augmented reality display of the augmented reality display device.

In addition, in certain embodiments, a method includes recognizing, via a guest recognition system, one or more guests in a venue. The method also includes generating, via a guest experience analysis system, guest experience information relating to the recognized one or more guests. The method further includes transmitting, via the guest experience analysis system, the guest experience information relating to the recognized one or more guests to an augmented reality display device for display on an augmented reality display of the augmented reality display device.

In addition, in certain embodiments, an augmented reality display device includes an augmented reality display configured to pass-through images of one or more guests of a venue. The augmented reality display device also includes one or more non-transitory, computer-readable media storing instructions which, when executed by at least one processor, cause the at least one processor to perform operations. The operations include receiving guest experience information relating to a targeted guest of the one or more guests from a guest experience analysis system. The operations also include superimposing the guest experience information relating to the targeted guest on the augmented reality display near pass-through images of the targeted guest.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
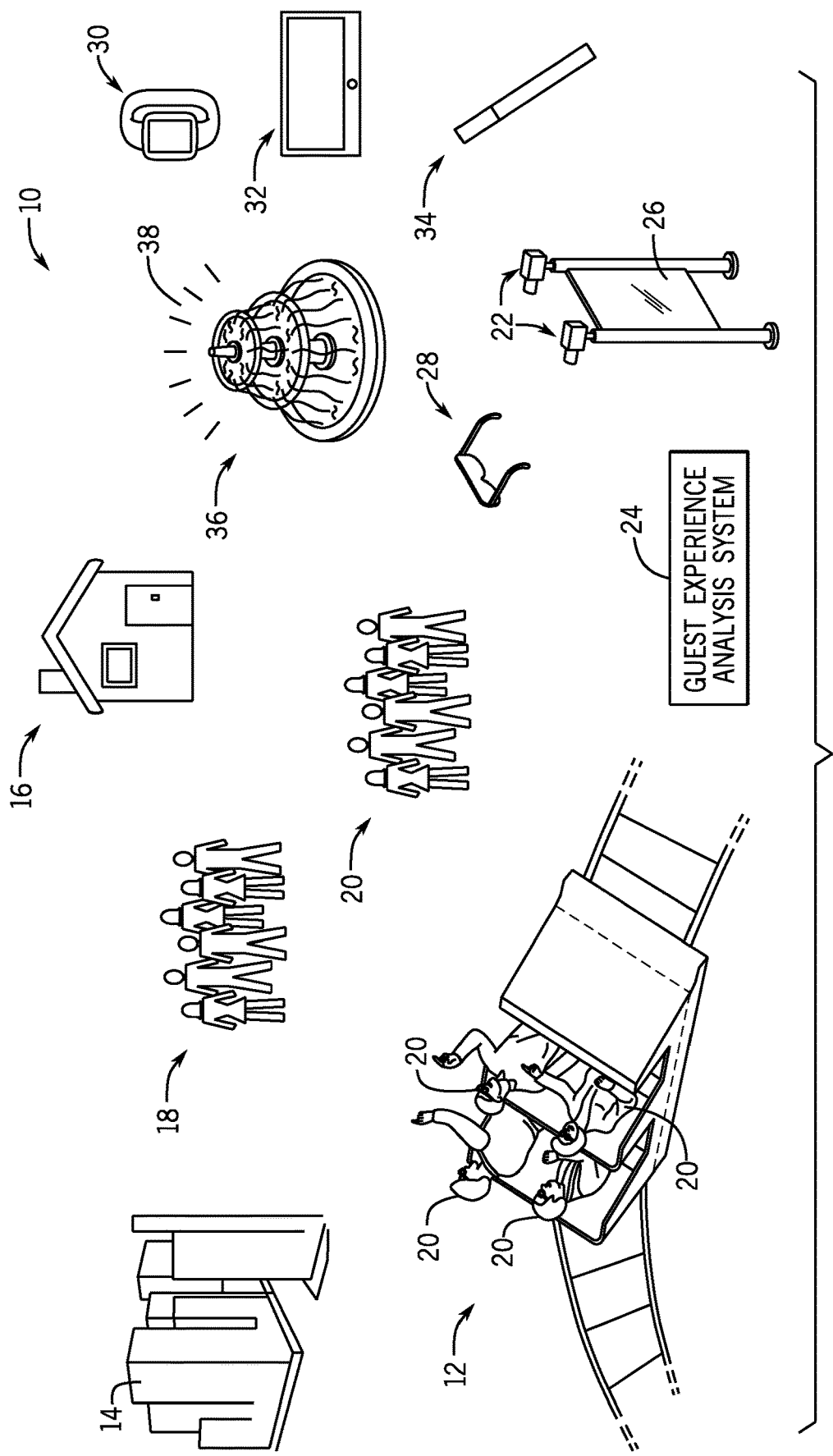
FIG. 1 illustrates features of a venue including one or more attractions, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure enable a more dynamic interaction experience for guests of venues, such as amusement or theme parks, where information relating to previous and current experiences of the guests within a venue are automatically (e.g., without any human intervention) provided to employees of the venue for the purpose of enabling the employees to enhance future experiences of the guests. More specifically, embodiments of the present disclosure enable the guests to be automatically recognized (e.g., by a computer-based augmented reality guest recognition system, as described in greater detail herein) during their time in the venue, and information related to the guests' experiences within the venue may be automatically (e.g., without any human intervention) presented to the employees of the venue to facilitate the employees enhancing future experiences of the guests within the venue. For example, in certain embodiments, the guests of the venue may be automatically recognized using facial recognition techniques, clothing recognition techniques, movement recognition techniques (e.g., to detect identifiable gaits of particular guests), and/or other guest recognition techniques, as described in greater detail herein, to track the previous and current experiences of the guests within the venue, and the information relating to such experiences may be automatically (e.g., without any human intervention) provided to the employees of the venue based at least in part on this automated guest recognition, as also described in greater detail herein.

With the foregoing mind, it may be useful to describe an embodiment of a venue 10, such as an amusement or theme park, as depicted in FIG. 1. As illustrated, in certain embodiments, the venue 10 may include thrill rides 12, venue facilities 14 (e.g., restaurants, souvenir shops, and so forth), additional venue attractions 16, and venue employees 18 (e.g., acting as themed characters, in certain embodiments). As described in greater detail herein, experiences of guests 20 of the venue 10 may be enhanced by the venue employees 18 based at least in part on information relating to previous and current experiences of the guests 20 within the venue 10, which may be automatically (e.g., without any human intervention) determined based at least in part on automated recognition of the guests 20 within the venue 10, and which may be presented to the venue employees 18 via an augmented reality system. For example, in certain embodiments, a guest recognition system 22 may automatically (e.g., without any human intervention) recognize the guests 20 for the purpose of tracking previous and current experiences of the guests 20 within the venue 10 using, for example, facial recognition techniques, movement recognition techniques (e.g., to detect identifiable gaits of particular guests 20), and/or other guest recognition techniques, as described in greater detail herein. In addition, in certain embodiments, the information relating to the guest recognition performed by the guest recognition system 22 may be analyzed by a guest experience analysis system 24 to determine information relating to previous and current experiences of the guests 20 within the venue 10, and this information may be provided to the venue employees 18 by an augmented reality system, as described in greater detail herein, to enable the venue employees 18 to enhance future experiences of the guests 20 within the venue 10.

For example, in certain embodiments, the augmented reality system may include one or more augmented reality display endpoints 26 that are configured to display augmented reality information with respect to guests 20 that are also displayed via the augmented reality display endpoints 26. In certain embodiments, the one or more augmented reality display endpoints 26 may be, for example, relatively stationary kiosks disposed at certain locations within the venue 10. As described in greater detail herein, in certain embodiments, the augmented reality display endpoints 26 may include transparent displays that pass-through images of the guests 20 while also augmenting the display with information relating to previous and current experiences of the guests 20, which is determined by the guest experience analysis system 24. In addition, in certain embodiments, to further enhance the guests' experiences, the augmented reality system may include one or more wearable augmented reality display devices 28 (e.g., augmented reality glasses, augmented reality goggles, other augmented reality headgear, and so forth) that are configured to display augmented reality information with respect to guests 20 that are also displayed via the wearable augmented reality display devices 28. As described in greater detail herein, in certain embodiments, the wearable augmented reality display devices 28 also may include transparent displays that pass-through images of the guests 20 while also augmenting the display with information relating to previous and current experiences of the guests 20, which is determined by the guest experience analysis system 24. For example, as described in greater detail herein, the information relating to previous and current experiences of a particular guest 20 may be superimposed onto a transparent display near a pass-through image of the particular guest 20 so that a venue employee 18 may easily recognize the information as being associated with the particular guest 20, thereby facilitating the venue employee 18 to help improve future experiences of the particular guest 20. In addition, in certain embodiments, the augmented reality display endpoints 26 and/or wearable augmented reality display devices 28 described herein may be configured to provide audio cues and/or haptic feedback indicative of information relating to guests 20 displayed via the augmented reality display endpoints 26 and/or wearable augmented reality display devices 28.

In addition, in certain embodiments, the information relating to previous and current experiences of the guests 20, which is determined by the guest experience analysis system 24, may also be presented to users (e.g., venue employees 18) via one or more wearable devices 30, one or more mobile devices 32, and/or other one or more themed devices 34. In certain embodiments, the wearable devices 30 may be watch-like electronic devices, bracelets, amulets, rings, headbands, hats, helmets, t-shirts, jackets, coats, shorts, pants, shoes, boots, or any other conveniently wearable items. In certain embodiments, the mobile devices 32 may be mobile phones (e.g., smartphones), tablet computers, or any other suitable devices that can be carried around the venue 10 by a guest 20. In certain embodiments, the themed devices 34 may be venue theme-related objects, such as toy guns, swords, flags, wands, and so forth. As described in greater detail herein, in certain embodiments, the wearable devices 30 and/or the themed devices 34 may either include circuitry (e.g., small chips) disposed within them (e.g., sewn within clothing material, and so forth) or may include unique patterns (e.g., images, and so forth) that may be passively tracked by the guest recognition system 22 to recognize the guests 20 and/or experiences of the guests 20.

In addition, in certain embodiments, one or more physical objects 36 disposed within a real-world environment of the venue 10 may be configured to generate one or more physical effects 38 (e.g., generation of sparks, generation of fire, generation of wind, movement, and so forth) based at least in part on control signals received from one or more of the devices 26, 28, 30, 32, 34 described herein, which may be caused to be transmitted by users (e.g., venue employees 18) based on the augmented reality information presented to the users (e.g., venue employees 18) via the devices 26, 28, 30, 32, 34. For example, based on the augmented reality information relating to a particular guest 20 presented to a venue employee 18 via a device 26, 28, 30, 32, 34, the venue employee 18 may determine that a particular physical effect 38 may enhance an experience of the particular guest 20, and the venue employee 18 may initiate a control signal being transmitted to a particular physical object 36 to generate the particular physical effect 38.

Figure 2:
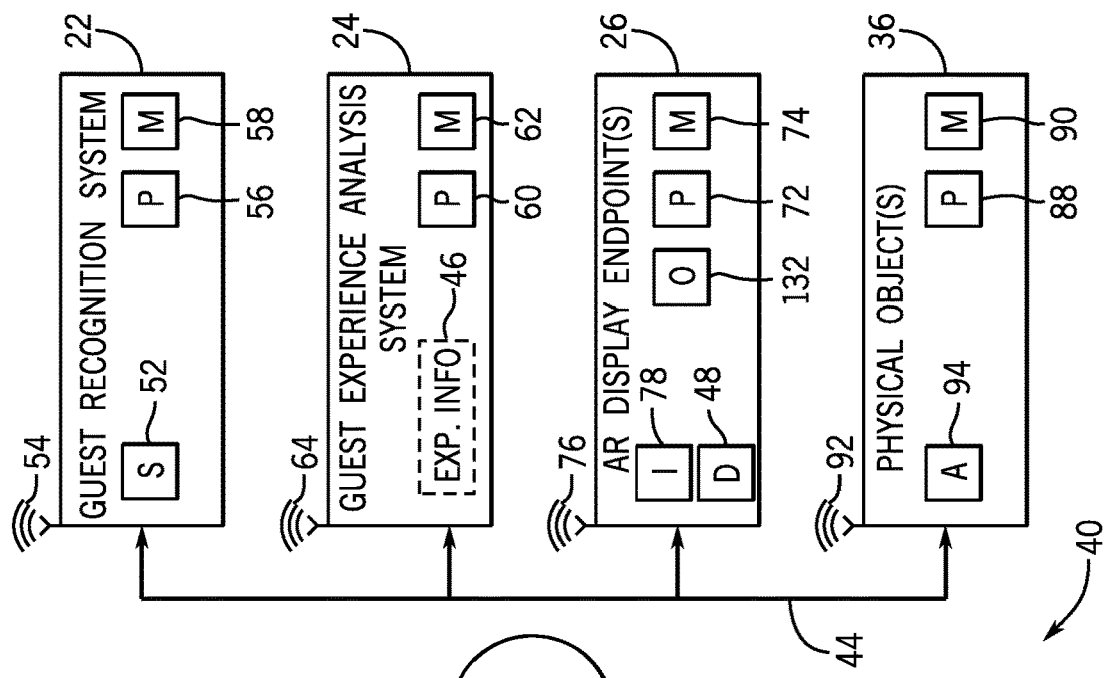
FIG. 2 is a schematic diagram of an augmented reality guest recognition system for providing an enhanced guest experience for the venue features illustrated in FIG. 1, in accordance with embodiments of the present disclosure.
Figure 2:
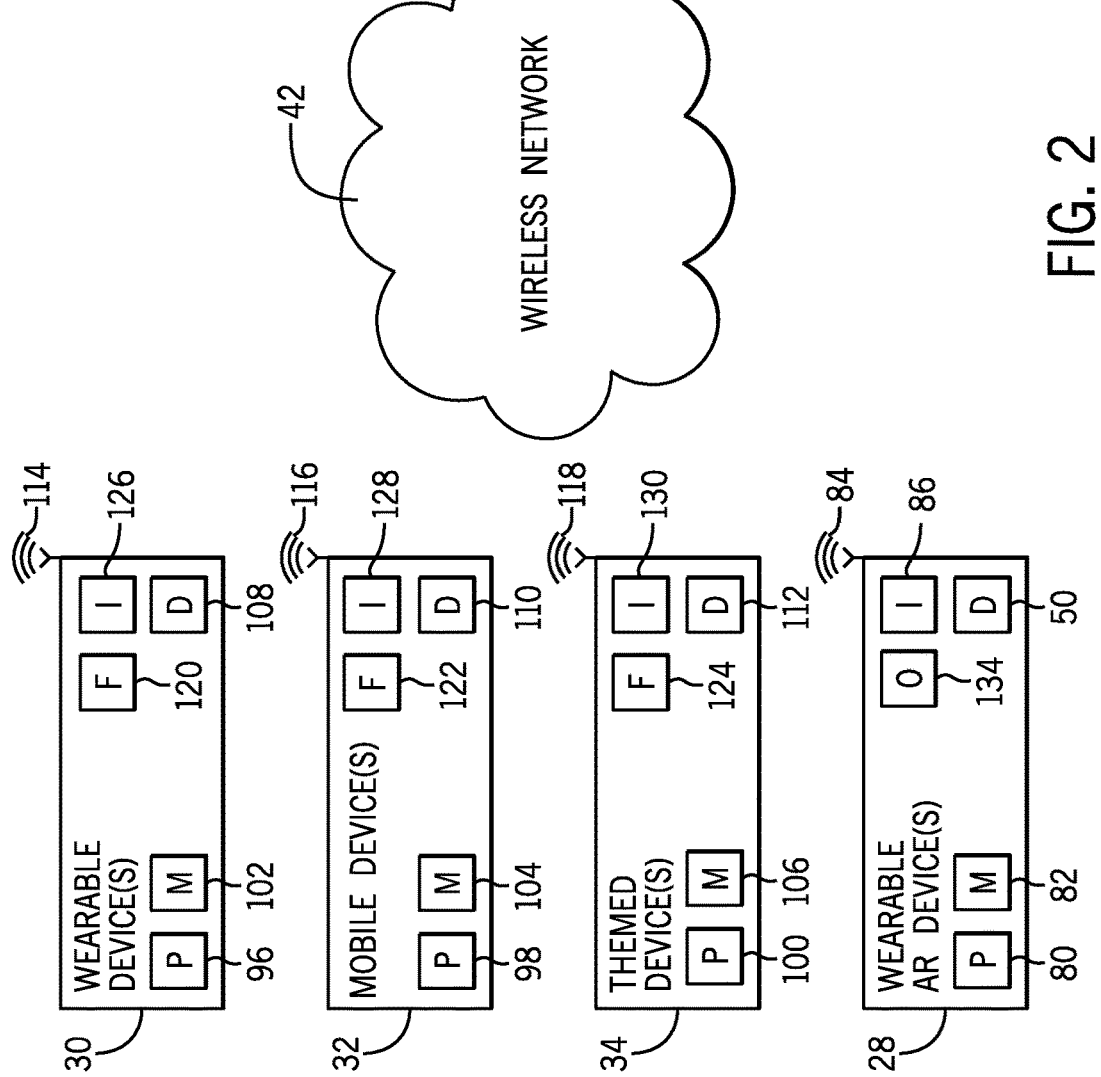

FIG. 2 is a schematic diagram of an augmented reality guest recognition system 40 for providing an enhanced guest experience for a venue 10, in accordance with embodiments of the present disclosure. As illustrated in FIG. 2, in certain embodiments, the augmented reality guest recognition system 40 may include a guest recognition system 22 and a guest experience analysis system 24 that are configured to cooperate together to recognize guests 20 while they are experiencing various features of the venue 10, for example, as illustrated in FIG. 1, and to provide users (e.g., venue employees 18) with augmented reality views of information relating to previous and current experiences of the guests 20 to enable the users (e.g., venue employees 18) to further enhance future experiences of the guests 20. For example, in certain embodiments, one or more augmented reality display endpoints 26 and/or one or more wearable augmented reality display devices 28 may be configured to display the augmented reality views of the information relating to the previous and current experiences of the guests 20 within the venue 10, which is generated by the guest experience analysis system 24 based at least in part on the information tracked by the guest recognition system 22.

Furthermore, in certain embodiments, one or more wearable devices 30, one or more mobile devices 32, and/or one or more themed devices 34 may also be configured to present the augmented reality views of the information relating to the previous and current experiences of the guests 20 within the venue 10, which is generated by the guest experience analysis system 24 based at least in part on the information tracked by the guest recognition system 22. Indeed, in certain embodiments, guests 20 of the venue 10 may be able to view at least a portion of the augmented reality views of the information relating to the previous and current experiences of guests 20 within the venue 10 via one or more wearable devices 30, one or more mobile devices 32, and/or one or more themed devices 34, and may provide inputs similar to those that may be received from users (e.g., venue employees 18) via the augmented reality display endpoints 26 and/or the wearable augmented reality display devices 28, as described in greater detail herein, via one or more wearable devices 30, one or more mobile devices 32, and/or one or more themed devices 34. In addition, in certain embodiments, data from one or more wearable devices 30, one or more mobile devices 32, and/or one or more themed devices 34 may be used by the guest experience analysis system 24 to determine certain experiences of certain guests 20, as described in greater detail herein. In addition, in certain embodiments, the augmented reality guest recognition system 40 may also include one or more physical objects 36 that are configured to generate one or more physical effects 38, as described in greater detail herein (e.g., with respect to FIG. 1).

In certain embodiments, the augmented reality display endpoints 26, the wearable augmented reality display devices 28, the wearable devices 30, the mobile devices 32, the themed devices 34, and/or the physical objects 36 may be communicatively coupled to the guest recognition system 22 and/or the guest experience analysis system 24 (e.g., within the venue 10) via a wireless network 42 (e.g., wireless local area networks (WLANs), wireless wide area networks (WWANs), near field communication (NFC) networks, or any other suitable wireless networks). In addition, in certain embodiments, the augmented reality display endpoints 26 and/or the physical objects 36 may be communicatively coupled to the guest recognition system 22 and/or the guest experience analysis system 24 via direct physical connection 44 (e.g., using communication cables).

In certain embodiments, as described in greater detail herein, the guest experience analysis system 24 may generate guest experience information 46 (e.g., metadata) to be displayed as augmenting information via, for example, displays 48, 50 of the augmented reality display endpoints 26 and/or the wearable augmented reality display devices 28, respectively, based at least in part on guest recognition data detected by the guest recognition system 22. For example, in certain embodiments, the guest recognition system 22 may include one or more guest recognition sensors 52 configured to collect data, which may be used by the guest recognition system 22 to recognize guests 20 within the venue 10. For example, in certain embodiments, the guest recognition sensors 52 may include cameras configured to collect images (and/or video streams) in substantially real time, and the guest recognition system 22 may execute facial recognition algorithms, clothing recognition algorithms, movement recognition algorithms (e.g., to detect identifiable gaits of particular guests 20), and other types of recognition algorithms, to detect identities of certain guests 20 (or groups of guests 20, as described in greater detail herein) within the venue 10. Based at least in part on this guest recognition, activity of guests 20 (or groups of guests 20, as described in greater detail herein) of the venue 10 may be tracked over time by the guest recognition system 22, and information relating to this tracked activity may be transmitted to the guest experience analysis system 24 via one or more communications interfaces 54 of the guest recognition system 22 for analysis and generation of the guest experience information 46, which relates to previous and current experiences of the guests 20 within the venue 10. The terms "real time" and "substantially real time" used herein indicate that images (or frames of the video streams) are obtained and/or provided in a timeframe substantially close to the time of actual observation (e.g., the images may be obtained and/or provided once every $\frac{1}{10}^{th}$ of a second, every $\frac{1}{15}^{th}$, every $\frac{1}{20}^{th}$ of a second, every $\frac{1}{30}^{th}$ of a second, every $\frac{1}{60}^{th}$ of a second, or even more frequently).

In general, the guest experience information 46 (e.g., metadata) may include any information relating to guests 20 (or groups of guests 20), including activity of the guests 20 (or groups of guests 20) within the venue 10. For example, the guest experience information 46 may include personal information about the guests 20, such as name, age, gender, height, weight, hometown, languages spoken, themed sections of the venue 10 in which the guests 20 are credentialed (e.g., entitled) to be, classifications for priority relating to particular themed sections or particular thrill rides 12, venue facilities 14, and/or other venue attractions 16 of the venue 10, whether the guests 20 are annual pass holders for the venue 10, number of times the guests 20 have visited the venue 10, associations with certain themed groups of the venue 10, and so forth. As will be appreciated, at least some of this personal information may be used by the guest recognition system 22 to recognize the guests 20 (or groups of guests 20).

In addition, as described in greater detail herein, the guest experience information 46 may include activity of the guests 20 (or groups of guests 20) within the venue 10, for example, number of times (and accumulated duration of time) the guests 20 (or groups of guests 20) rode, or otherwise visited, certain thrill rides 12, venue facilities 14, and/or other venue attractions 16 of the venue 10, what the guests 20 (or groups of guests 20) are currently doing in the context of a particular themed section of the venue 10 within which the guests 20 (or group of guests 20) are currently located, and so forth. As one non-limiting example, if a particular guest 20 (or group of guests 20) is determined to currently be on a scavenger hunt, such information may indicate to a venue employee 18 that the guest 20 (or group of guests 20) may benefit from a hint relating to the scavenger hunt. As described in greater detail herein, the guest experience information 46 may also include interaction of the guests 20 with particular wearable devices 30, mobile devices 32, and/or themed devices 34 associated with the guests 20.

In certain embodiments, the guest recognition system 22 may include processing circuitry, such as a processor 56 (e.g., general purpose processor or other processor) and a memory 58, and may process the data collected by the one or more guest recognition sensors 52 to, for example, detect identities of certain guests 20 (or groups of guest 20, as described in greater detail herein) within the venue 10, track activity of the identified guests 20, and convert the data into a form suitable for processing by the guest experience analysis system 24. In addition, in certain embodiments, the guest recognition system 22 may be configured to identify when certain guests 20 are in relatively close proximity (e.g., within 30 feet, within 25 feet, within 20 feet, within 15 feet, within 10 feet, within 5 feet, or even closer) to other guests 20 for certain non-negligible amounts of time (e.g., greater than 10 minutes/day, greater than 20 minutes/day, greater than 30 minutes/day, or even longer) such that the guests 20 may be identifiable by the guest recognition system 22 as a group of guests 20, such that the guest experience analysis system 24 may analyze the experiences of the group of guests 20 as opposed to, or in addition to, experiences of the individual guests 20 themselves. The ability of the guest recognition system 22 to identify groups of guests 20, as opposed to just individual guests 20, improves the confidence level that the individual guests 20 are, indeed, the guests 20 that the guest recognition system 22 believes them to be, thereby improving the quality of the guest experience information 46 ultimately analyzed by the guest experience analysis system 24. Instructions (e.g., facial recognition algorithms, clothing recognition algorithms, movement recognition algorithms, and other type of algorithms) to perform these functions may be encoded in programs or code stored in tangible non-transitory computer-readable media, such as the memory 58 and/or other storage. In certain embodiments, the processor 56 may be a general-purpose processor, system-on-chip (SoC) device, an application-specific integrated circuit (ASIC), or some other similar processor configuration. In certain embodiments, the processor 56 may include more than one processor.

In certain embodiments, as described in greater detail herein, the guest experience analysis system 24 may include processing circuitry, such as a processor 60 (e.g., general purpose processor or other processor) and a memory 62, which may process the data relating to the guest recognition performed by the guest recognition system 22, which may be received from the guest recognition system 22 via one or more communications interfaces 64 of the guest experience analysis system 24, to generate the guest experience information 46 for individual guests 20 (or groups of guests 20), which may be displayed as augmenting information via, for example, displays 48, 50 of the augmented reality display endpoints 26 and/or the wearable augmented reality display devices 28, respectively. In addition, in certain embodiments, the guest experience information 46 generated by the guest experience analysis system 24 may include recommendations for individual guests 20 (or groups of guests 20) based at least in part on the other guest experience information 46 for the individual guests 20 (or groups of guests 20). For example, if a particular guest 20 has visited a particular subset of venue attractions 16 within the venue 10 a relatively large number of times, the guest experience analysis system 24 may determine that a recommendation to visit a similar venue attraction 16 within the venue 10 should be provided to the particular guest 20. In certain embodiments, the guest experience analysis system 24 may store the generated guest experience information in a database, for example, in the memory 62 of the guest experience analysis system 24.

In addition, as described in greater detail herein, in certain embodiments, the guest experience information 46 may be generated based at least in part on guest activity data collected from one or more wearable devices 30, one or more mobile devices 32, and/or one or more themed devices 34 associated with the guests 20. For example, certain activity of the guests 20 within the venue 10 (e.g., certain movement within the venue 10 tracked by a wearable device 30 assigned to a guest 20, certain information entered directly into a mobile device 32 by a guest 20, certain interactions with a themed device 34 assigned to a guest 20, and so forth) may be directly tracked by the one or more wearable devices 30, one or more mobile devices 32, and/or one or more themed devices 34 associated with the guests 20, and transmitted to the one or more communications interfaces 64 of the guest experience analysis system 24 to help the guest experience analysis system 24 generate the guest experience information 46 for the guests 20. Instructions to perform these functions may be encoded in programs or code stored in tangible non-transitory computer-readable media, such as the memory 62 and/or other storage. In certain embodiments, the processor 60 may be a general-purpose processor, system-on-chip (SoC) device, an application-specific integrated circuit (ASIC), or some other similar processor configuration. In certain embodiments, the processor 60 may include more than one processor.

In certain embodiments, once the guest experience analysis system 24 generates the guest experience information 46, the guest experience analysis system 24 may transmit the generated guest experience information 46 to the augmented reality display endpoints 26 and/or the wearable augmented reality display devices 28 such that the augmented reality display endpoints 26 and/or the wearable augmented reality display devices 28 may display the guest experience information 46 as augmenting information on one or more displays 48, 50 of the augmented reality display endpoints 26 and/or the wearable augmented reality display devices 28, respectively. In addition, in certain embodiments, once the guest experience analysis system 24 generates the guest experience information 46, the guest experience analysis system 24 may transmit the generated guest experience information 46 to one or more wearable devices 30, one or more mobile devices 32, and/or one or more themed devices 34 such that the one or more wearable devices 30, one or more mobile devices 32, and/or one or more themed devices 34 may display the guest experience information 46 as augmenting information on displays 108, 110, 112 of the one or more wearable devices 30, one or more mobile devices 32, and/or one or more themed devices 34, respectively, similar to the functionality of the augmented reality display endpoints 26 and/or the wearable augmented reality display devices 28 described herein. For example, in certain embodiments, guests 20 of the venue 10 may be able to view at least a portion of the augmented reality views of the guest experience information 46 relating to the previous and current experiences of guests 20 within the venue 10 via one or more wearable devices 30, one or more mobile devices 32, and/or one or more themed devices 34, and may provide inputs similar to those that may be received from users (e.g., venue employees 18) via the augmented reality display endpoints 26 and/or the wearable augmented reality display devices 28, as described in greater detail herein, via one or more wearable devices 30, one or more mobile devices 32, and/or one or more themed devices 34.

In certain embodiments, the augmented reality display endpoints 26 may include processing circuitry, such as a processor 72 and a memory 74. The processor 72 may be operatively coupled to the memory 74 to execute instructions for at least partially carrying out the presently disclosed techniques of displaying guest experience information 46 as augmenting information on the one or more displays 48 of the augmented reality display endpoints 26, to enable users (e.g., venue employees 18) to enhance the experiences of the guests 20, as described in greater detail herein. These instructions may be encoded in programs or code stored in tangible non-transitory computer-readable media, such as the memory 74 and/or other storage. In certain embodiments, the processor 72 may be a general-purpose processor, system-on-chip (SoC) device, an application-specific integrated circuit (ASIC), or some other similar processor configuration. In certain embodiments, the processor 72 may include more than one processor. Furthermore, in certain embodiments, the augmented reality display endpoints 26 may also receive the guest experience information 46 from the guest experience analysis system 24 via one or more communications interfaces 76 of the augmented reality display endpoints 26.

In certain embodiments, the one or more displays 48 of the augmented reality display endpoints 26 may each include a liquid crystal display (LCD), an organic light emitting diode (OLED) display, or other similar display configured to display the guest experience information 46 as augmenting information. In certain embodiments, the one or more displays 48 of the augmented reality display endpoints 26 may each include an opaque or see-through LCD or an opaque or see-through OLED display configured to allow, for example, venue employees 18 to view the guest experience information 46 appearing on the displays 48 while preserving the ability to see through the respective displays 48 to the actual and physical real-world environment of the venue 10 (e.g., to pass-through images of guests 20 to which the guest experience information relates). For example, as described in greater detail herein, guest experience information 46 for a targeted guest 20 (or targeted group of guests 20) may be superimposed on a display 48 of the augmented reality display endpoints 26 near (e.g., adjacent or within relatively close proximity to) pass-through images of the targeted guest 20 (or targeted group of guests 20).

In addition, in certain embodiments, the augmented reality display endpoints 26 may be configured to provide audio cues and/or haptic feedback indicative of the guest experience information 46 relating to guests 20 displayed via the one or more displays 48 of the augmented reality display endpoints 26. In particular, in certain embodiments, the augmented reality display endpoints 26 may include one or more output devices 132 configured to generate audio cues and/or haptic feedback indicative of the guest experience information 46 relating to guests 20 displayed via the one or more displays 48 of the augmented reality display endpoints 26. For example, in certain embodiments, the one or more output devices 132 of the augmented reality display endpoints 26 may include audio speakers configured to output audio cues and/or haptic devices configured to output haptic feedback.

As described in greater detail herein, in certain embodiments, the guest experience information 46 displayed on the one or more displays 48 of the augmented reality display endpoints 26 may include recommendations for targeted guests 20 (or targeted groups of guests 20) based at least in part on the other guest experience information 46 for the targeted guests 20 (or targeted groups of guests 20). Indeed, in certain embodiments, upon determination of a particular recommendation for a guest 20 (or group of guests 20), the guest experience analysis system 24 may transmit the determined recommendation to an augmented reality display endpoint 26, and the augmented reality display endpoint 26 may display the determined recommendation on a display 48 of the augmented reality display endpoint 26, and may also generate an alert (e.g., flashing light proximate the determined recommendation and/or flashing text of the determined recommendation) on the display 48, for example, to draw the attention of a venue employee 18. Moreover, in certain embodiments, upon determination of a particular recommendation for a guest 20 (or group of guests 20), the guest experience analysis system 24 may transmit the determined recommendation to an augmented reality display endpoint 26, and the augmented reality display endpoint 26 may switch focus (e.g., highlighting or other indication) from a first targeted guest 20 (or group of guests 20) to a second targeted guest 20 (or group of guests 20) to which the determined recommendation relates.

In addition, in certain embodiments, the augmented reality display endpoints 26 may include one or more input devices 78 configured to receive inputs from users (e.g., venue employees 18) of the augmented reality display endpoints 26, which may be transmitted back to the guest experience analysis system 24 via the one or more communications interfaces 76 of the augmented reality display endpoints 26. In certain embodiments, the one or more input devices 78 of the augmented reality display endpoints 26 may include audio sensors (e.g., microphones), cameras (e.g., to capture images for the purpose of recognizing gestures), touch screens (e.g., incorporated into the one or more displays 48), joysticks, trackballs, buttons, and/or other inputs devices suitable for receiving inputs from users (e.g., venue employees 18) of the augmented reality display endpoints 26. For example, in certain embodiments, the one or more input devices 78 of the augmented reality display endpoints 26 may include one or more audio sensors configured to capture audio (e.g., voice commands) generated by users (e.g., venue employees 18), which may be processed by the processing circuitry of the augmented reality display endpoints 26 to generate information that may be transmitted to the guest experience analysis system 24. In addition, in certain embodiments, the one or more input devices 78 of the augmented reality display endpoints 26 may include one or more cameras for capturing images of users (e.g., venue employees 18) and/or body features of users (e.g., venue employees 18), which may be processed by the processing circuitry of the augmented reality display endpoints 26 to recognize gestures of the users (e.g., venue employees 18), which may be converted into information that may be transmitted to the guest experience analysis system 24. In addition, in certain embodiments, the one or more input devices 78 of the augmented reality display endpoints 26 may include one or more touch screens (e.g., incorporated into the one or more displays 48 of the augmented reality display endpoints 26) with which users (e.g., venue employees 18) may interact to enter information, for example, via a context-sensitive menu displayed via the one or more displays 48), which may be transmitted to the guest experience analysis system 24.

In certain embodiments, as described in greater detail herein, the one or more input devices 78 of the augmented reality display endpoints 26 may receive modified and/or additional guest experience information 46 relating to a targeted guest 20 (or group of guests 20), and the modified and/or additional guest experience information 46 may be transmitted back to the guest experience analysis system 24 for analysis by the guest experience analysis system 24. In addition, as described in greater detail herein, in certain embodiments, the one or more input devices 78 of the augmented reality display endpoints 26 may receive a command to switch focus (e.g., highlighting or other indication) from a first targeted guest 20 (or group of guests 20) to a second targeted guest 20 (or group of guests 20), and the processing circuitry of the respective augmented reality display endpoint 26 may cause the focus to be switched on a display 48 of the respective augmented reality display endpoint 26 in accordance with the command. In addition, as described in greater detail herein, in certain embodiments, the one or more input devices 78 of the augmented reality display endpoints 26 may receive information relating to a command to implement one or more physical effects 38 via one or more physical objects 36 disposed within the venue 10, and the command may be transmitted to the guest experience analysis system 24, which may in turn generate a command signal to be sent to the one or more physical objects 36 to implement the one or more physical effects 38. In addition, as described in greater detail herein, in certain embodiments, the one or more input devices 78 of the augmented reality display endpoints 26 may receive information relating to a command to implement one or more actions (e.g., physical effects 38, information alerts, and so forth) to occur for one or more wearable devices 30, mobile devices 32, and/or themed devices 34 associated with one or more guests 20, and the command may be transmitted to the guest experience analysis system 24, which may in turn generate a command signal to be sent to the one or more wearable devices 30, mobile devices 32, and/or themed devices 34 to implement the one or more actions.

In general, the functionality of the wearable augmented reality display devices 28 described herein may be substantially similar to the functionality of the augmented reality display endpoints 26 described herein. For example, in certain embodiments, the wearable augmented reality display devices 28 may include processing circuitry, such as a processor 80 and a memory 82. The processor 80 may be operatively coupled to the memory 82 to execute instructions for at least partially carrying out the presently disclosed techniques of displaying guest experience information 46 as augmenting information on the one or more displays 50 of the wearable augmented reality display devices 28, to enable users (e.g., venue employees 18) to enhance the experiences of the guests 20, as described in greater detail herein. These instructions may be encoded in programs or code stored in tangible non-transitory computer-readable media, such as the memory 82 and/or other storage. In certain embodiments, the processor 80 may be a general-purpose processor, system-on-chip (SoC) device, an application-specific integrated circuit (ASIC), or some other similar processor configuration. In certain embodiments, the processor 80 may include more than one processor. Furthermore, in certain embodiments, the wearable augmented reality display devices 28 may also receive the guest experience information 46 from the guest experience analysis system 24 via one or more communications interfaces 84 of the wearable augmented reality display devices 28.

In certain embodiments, the one or more displays 50 of the wearable augmented reality display devices 28 may each include a liquid crystal display (LCD), an organic light emitting diode (OLED) display, or other similar display configured to display the guest experience information 46 as augmenting information. In certain embodiments, the one or more displays 50 of the wearable augmented reality display devices 28 may each include an opaque or see-through LCD or an opaque or see-through OLED display configured to allow, for example, venue employees 18 to view the guest experience information 46 appearing on the displays 50 while preserving the ability to see through the respective displays 50 to the actual and physical real-world environment of the venue 10 (e.g., to pass-through images of guests 20 to which the guest experience information relates). For example, as described in greater detail herein, guest experience information 46 for a targeted guest 20 (or targeted group of guests 20) may be superimposed on a display 50 of the wearable augmented reality display devices 28 near (e.g., adjacent or within relatively close proximity to) pass-through images of the targeted guest 20 (or targeted group of guests 20).

In addition, in certain embodiments, the wearable augmented reality display devices 28 may be configured to provide audio cues and/or haptic feedback indicative of the guest experience information 46 relating to guests 20 displayed via the one or more displays 50 of the wearable augmented reality display devices 28. In particular, in certain embodiments, the wearable augmented reality display devices 28 may include one or more output devices 134 configured to generate audio cues and/or haptic feedback indicative of the guest experience information 46 relating to guests 20 displayed via the one or more displays 50 of the wearable augmented reality display devices 28. For example, in certain embodiments, the one or more output devices 134 of the wearable augmented reality display devices 28 may include audio speakers configured to output audio cues and/or haptic devices configured to output haptic feedback.

As described in greater detail herein, in certain embodiments, the guest experience information 46 displayed on the one or more displays 50 of the wearable augmented reality display devices 28 may include recommendations for targeted guests 20 (or targeted groups of guests 20) based at least in part on the other guest experience information 46 for the targeted guests 20 (or targeted groups of guests 20). Indeed, in certain embodiments, upon determination of a particular recommendation for a guest 20 (or group of guests 20), the guest experience analysis system 24 may transmit the determined recommendation to a wearable augmented reality display device 28, and the wearable augmented reality display device 28 may display the determined recommendation on a display 50 of the wearable augmented reality display device 28, and may also generate an alert (e.g., flashing light proximate the determined recommendation and/or flashing text of the determined recommendation) on the display 50, for example, to draw the attention of a venue employee 18. Moreover, in certain embodiments, upon determination of a particular recommendation for a guest 20 (or group of guests 20), the guest experience analysis system 24 may transmit the determined recommendation to a wearable augmented reality display device 28, and the wearable augmented reality display device 28 may switch focus (e.g., highlighting or other indication) from a first targeted guest 20 (or group of guests 20) to a second targeted guest 20 (or group of guests 20) to which the determined recommendation relates.

In addition, in certain embodiments, the wearable augmented reality display devices 28 may include one or more input devices 86 configured to receive inputs from users (e.g., venue employees 18) of the wearable augmented reality display devices 28, which may be transmitted back to the guest experience analysis system 24 via the one or more communications interfaces 84 of the wearable augmented reality display devices 28. In certain embodiments, the one or more input devices 86 of the wearable augmented reality display devices 28 may include audio sensors (e.g., microphones), cameras (e.g., to capture images for the purpose of recognizing gestures), trackballs, buttons, and/or other inputs devices suitable for receiving inputs from users (e.g., venue employees 18) of the wearable augmented reality display devices 28. For example, in certain embodiments, the one or more input devices 86 of the wearable augmented reality display devices 28 may include one or more audio sensors configured to capture audio (e.g., voice commands) generated by users (e.g., venue employees 18), which may be processed by the processing circuitry of the wearable augmented reality display devices 28 to generate information that may be transmitted to the guest experience analysis system 24. In addition, in certain embodiments, the one or more input devices 86 of the wearable augmented reality display devices 28 may include one or more cameras for capturing images of users (e.g., venue employees 18) and/or body features of users (e.g., venue employees 18), which may be processed by the processing circuitry of the wearable augmented reality display devices 28 to recognize gestures of the users (e.g., venue employees 18), which may be converted into information that may be transmitted to the guest experience analysis system 24.

In certain embodiments, as described in greater detail herein, the one or more input devices 86 of the wearable augmented reality display devices 28 may receive modified and/or additional guest experience information 46 relating to a targeted guest 20 (or group of guests 20), and the modified and/or additional guest experience information 46 may be transmitted back to the guest experience analysis system 24 for analysis by the guest experience analysis system 24. In addition, as described in greater detail herein, in certain embodiments, the one or more input devices 86 of the wearable augmented reality display devices 28 may receive a command to switch focus (e.g., highlighting or other indication) from a first targeted guest 20 (or group of guests 20) to a second targeted guest 20 (or group of guests 20), and the processing circuitry of the respective wearable augmented reality display device 28 may cause the focus to be switched on a display 50 of the respective wearable augmented reality display device 28 in accordance with the command. In addition, as described in greater detail herein, in certain embodiments, the one or more input devices 86 of the wearable augmented reality display devices 28 may receive information relating to a command to implement one or more physical effects 38 via one or more physical objects 36 disposed within the venue 10, and the command may be transmitted to the guest experience analysis system 24, which may in turn generate a command signal to be sent to the one or more physical objects 36 to implement the one or more physical effects 38. In addition, as described in greater detail herein, in certain embodiments, the one or more input devices 86 of the wearable augmented reality display devices 28 may receive information relating to a command to implement one or more actions (e.g., physical effects 38, information alerts, and so forth) to occur for one or more wearable devices 30, mobile devices 32, and/or themed devices 34 associated with one or more guests 20, and the command may be transmitted to the guest experience analysis system 24, which may in turn generate a command signal to be sent to the one or more wearable devices 30, mobile devices 32, and/or themed devices 34 to implement the one or more actions.

As described in greater detail herein, in certain embodiments, the guest experience analysis system 24 may receive commands from the augmented reality display endpoints 26 and/or the wearable augmented reality display devices 28 to implement physical effects 38 via physical objects 36 disposed within the real-world environment of the venue 10 to, for example, further enhance the experiences of guests 20. In certain embodiments, the physical objects 36 may include processing circuitry, such as a processor 88 and a memory 90. The processor 88 may be operatively coupled to the memory 90 to execute instructions for implementing physical effects 38 based on such commands received from the guest experience analysis system 24 via one or more communications interfaces 92 of the physical objects 36. These instructions may be encoded in programs or code stored in tangible non-transitory computer-readable media, such as the memory 90 and/or other storage. In certain embodiments, the processor 88 may be a general-purpose processor, system-on-chip (SoC) device, an application-specific integrated circuit (ASIC), or some other similar processor configuration. In certain embodiments, the processor 88 may include more than one processor.

In certain embodiments, the physical effects 38 may be implemented, for example, via physical actuation mechanisms 94 that are associated with the physical objects 36. For example, in certain embodiments, the physical effects 38 may be electrical sparks emanating from the physical object 36 as generated by an electrical power source, flames emanating from the physical object 36 as generated by an ignition system, wind emanating from the physical object 36 as generated by a wind system, movement of a portion of the physical object 36, and so forth. In addition, as described in greater detail herein, in certain embodiments, similar actions (e.g., physical effects 38, information alerts, and so forth) may be implemented via one or more wearable devices 30, mobile devices 32, and/or themed devices 34 associated with one or more guests 20 based at least in part on commands transmitted to the guest experience analysis system 24 by the augmented reality display endpoints 26 and/or the wearable augmented reality display devices 28, which may in turn generate a command signal sent to the one or more wearable devices 30, mobile devices 32, and/or themed devices 34 to implement the one or more actions.

In certain embodiments, certain functionality of the augmented reality display endpoints 26 and/or the wearable augmented reality display devices 28 may be replicated by the one or more wearable devices 30, mobile devices 32, and/or themed devices 34 described herein. Indeed, in certain embodiments, both venue employees 18 and/or guests 20 may be capable of experiencing at least a portion of the functionality of the augmented reality display endpoints 26 and/or the wearable augmented reality display devices 28 via the one or more wearable devices 30, mobile devices 32, and/or themed devices 34 described herein. For example, in certain embodiments, the one or more wearable devices 30, mobile devices 32, and/or themed devices 34 may include respective processing circuitry, such as a processor 96, 98, 100 and a memory 102, 104, 106. The respective processor 96, 98, 100 may be operatively coupled to the respective memory 102, 104, 106 to execute instructions for at least partially carrying out the presently disclosed techniques of displaying guest experience information 46 as augmenting information on one or more respective displays 108, 110, 112 of the one or more wearable devices 30, mobile devices 32, and/or themed devices 34, to enable users (e.g., venue employees 18) to enhance the experiences of the guests 20, as described in greater detail herein. These instructions may be encoded in programs or code stored in tangible non-transitory computer-readable media, such as the memory 102, 104, 106 and/or other storage. In certain embodiments, the processors 96, 98, 100 may be general-purpose processors, system-on-chip (SoC) devices, application-specific integrated circuits (ASICs), or some other similar processor configurations. In certain embodiments, the processors 96, 98, 100 may include more than one processor. Furthermore, in certain embodiments, the one or more wearable devices 30, mobile devices 32, and/or themed devices 34 may also receive the guest experience information 46 from the guest experience analysis system 24 via one or more respective communications interfaces 114, 116, 118 of the one or more wearable devices 30, mobile devices 32, and/or themed devices 34.

In addition, in certain embodiments, the one or more wearable devices 30, mobile devices 32, and/or themed devices 34 may be used to aid the guest recognition performed by the guest recognition system 22. For example, in addition to (or as an alternative to) the recognition of guests 20 (or groups of guests 20) performed by the guest recognition system 22 described above, the guest recognition sensors 52 may include sensors that are configured to track activity of one or more wearable devices 30, mobile devices 32, and/or themed devices 34 associated with certain guests 20, which may be used by the guest recognition system 22 to determine previous and current experiences of the guests 20 within the venue 10. For example, in certain embodiments, the one or more wearable devices 30, mobile devices 32, and/or themed devices 34 may include respective sets of features 120, 122, 124 (e.g., geometric aspects or markings) that may be passively monitored by the guest recognition system 22 (e.g., a camera system, such as a light detection and ranging (LiDAR) system) to track activity of the guests 20 to which the particular devices 30, 32, 34 are associated. In addition, in certain embodiments, the one or more wearable devices 30, mobile devices 32, and/or themed devices 34 may include respective sets of input devices 126, 128, 130 with which guests 20 associated with particular device 30, 32, 34 may interact to enter information, which may be transmitted to the guest recognition system 22 and/or the guest experience analysis system 24.

Figure 3:
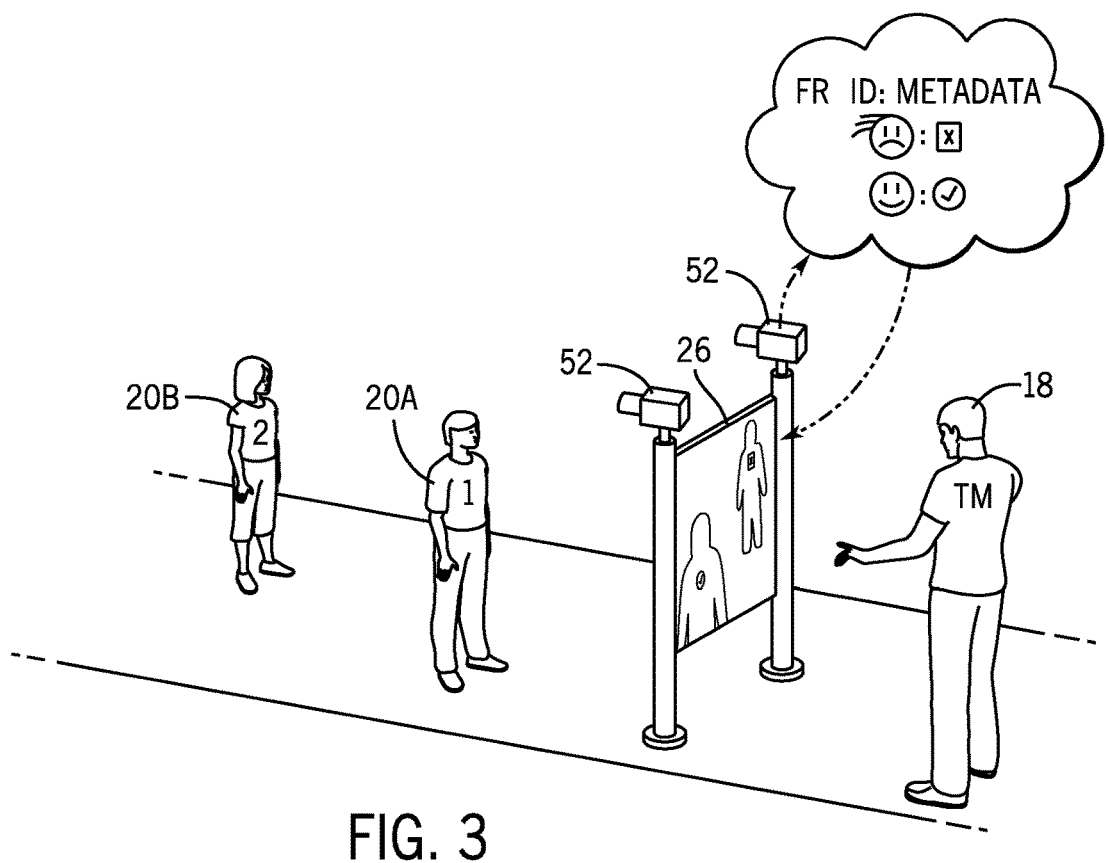
FIG. 3 illustrates an exemplary portion of the augmented reality guest recognition system of FIG. 2, in accordance with embodiments of the present disclosure.

As described in greater detail herein, in certain embodiments, the guest recognition system 22 of the augmented reality guest recognition system 40 includes one or more guest recognition sensors 52 configured to collect data, which may be used by the guest recognition system 22 to recognize guests 20 (or groups of guests 20) within the venue 10, and the guest experience analysis system 24 of the augmented reality guest recognition system 40 is configured to analyze information relating to the guest recognition performed by the guest recognition system 22, and received from the guest recognition system 22, to determine guest experience information 46 relating to previous and current experiences of the guests 20 (or groups of guests 20) within the venue 10, and this guest experience information 46 may be provided to one or more augmented reality display endpoints 26 and/or one or more wearable augmented reality display devices 28 to enable users (e.g., venue employees 18) to enhance future experiences of the guests 20 (or groups of guests 20) within the venue 10. FIG. 3 illustrates an exemplary portion of the augmented reality guest recognition system 40 of FIG. 2. Specifically, FIG. 3 illustrates a first guest 20A, a second guest 20B, and a venue employee 18 in relatively close proximity to guest recognition sensors 52 and an augmented reality display endpoint 26. In the illustrated embodiment, the guest recognition sensors 52 and the augmented reality display endpoint 26 are integrated into a single relatively stationary structure. However, in other embodiments, guest recognition sensors 52 may not be integrated with augmented reality display endpoints 26.

Figure 4:
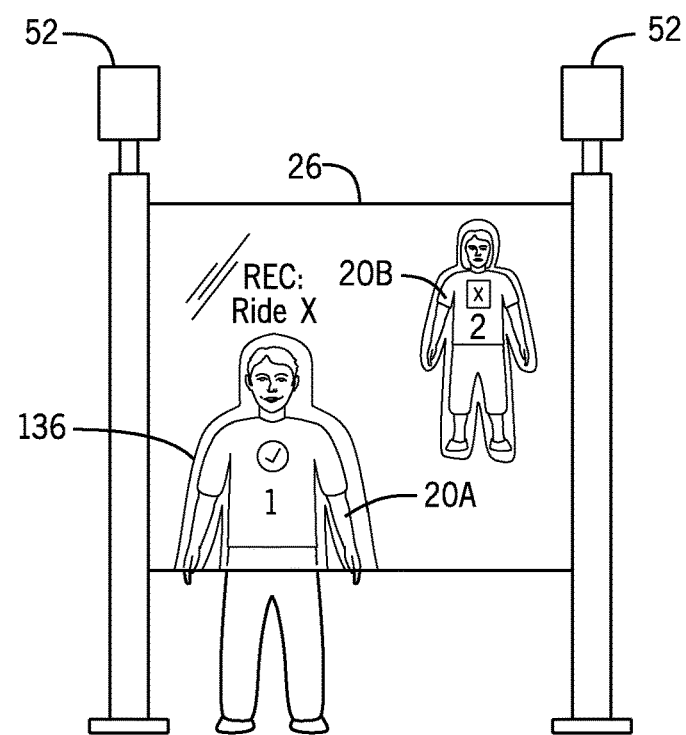
FIG. 4 illustrates the guest recognition sensors and the augmented reality display endpoint of FIG. 3 from the point-of-view of a venue employee, illustrating exemplary guest experience information relating to guests of the venue, in accordance with embodiments of the present disclosure.

FIG. 4 illustrates the guest recognition sensors 52 and the augmented reality display endpoint 26 of FIG. 3 from the point-of-view of the venue employee 18, illustrating exemplary guest experience information 46 relating to the first guest 20A and the second guest 20B. As illustrated in FIG.

4, the first guest 20A is a currently targeted guest, for example, highlighted by a glow 136 around the pass-through image of the first guest 20A (or otherwise visually indicated, in other embodiments) as being focused on by the display 48 of the augmented reality display endpoint 26, and the pass-through image of the second guest 20B does not have such visual indication. As described in greater detail herein, in certain embodiments, the focus on the first guest 20A may be switched to the second guest 20B based on a command received by the augmented reality display endpoint 26 from the venue employee 18.

Figure 5:
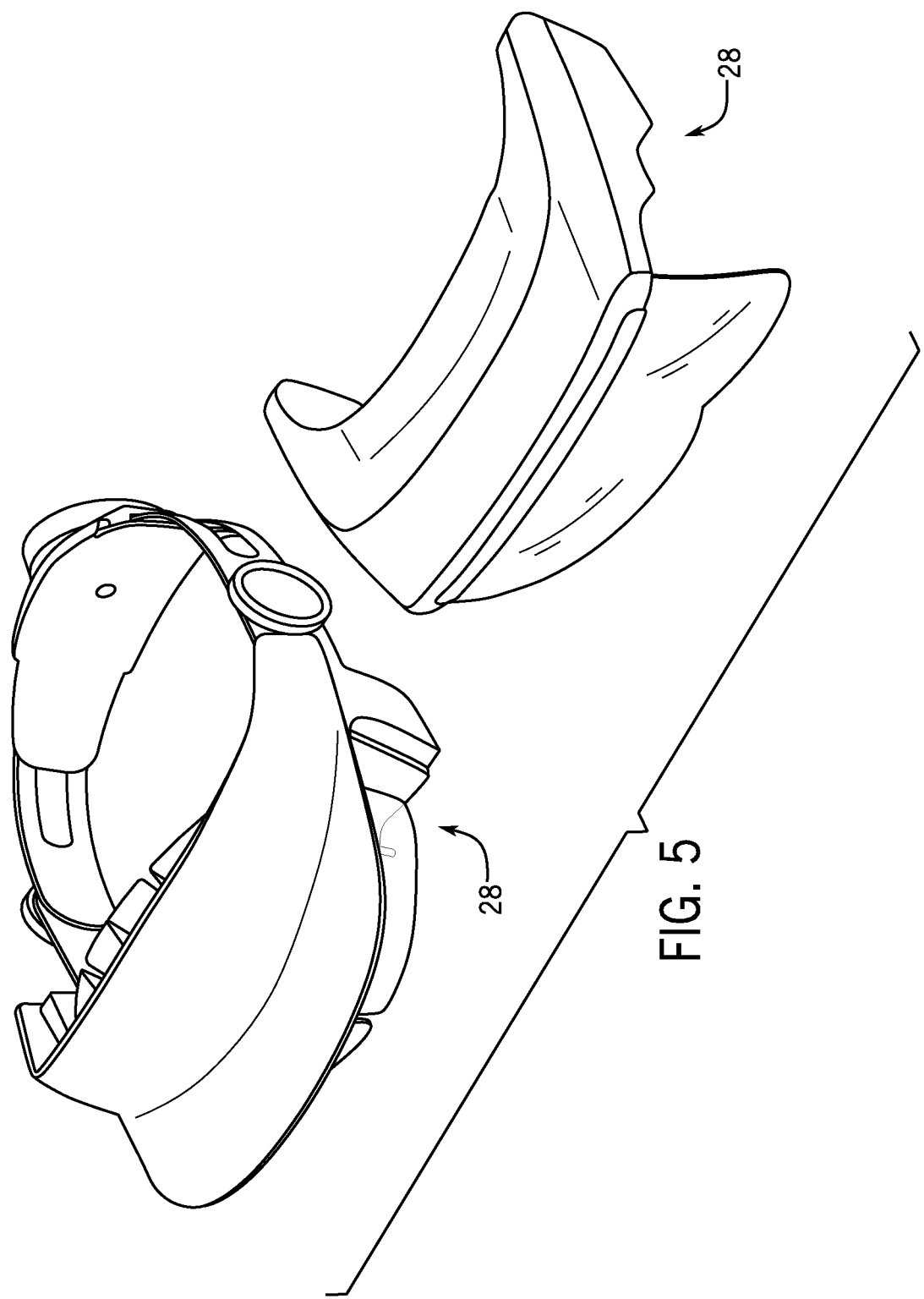
FIG. 5 illustrates wearable augmented reality display devices (e.g., augmented reality glasses, augmented reality goggles, other augmented reality headgear, and so forth), in accordance with embodiments of the present disclosure.

It will be appreciated that the functionality of the wearable augmented reality display devices 28 described herein may be substantially similar to the functionality of the augmented reality display endpoints 26 described herein, with the main difference being that the views of the guest experience information 46 relating to guests 20 of the venue 10 may be hidden from view of the guests 20, thereby enhancing the immersion of the delivery of the guest experience information 46 to the users (e.g., venue employees 18). For example, FIG. 5 illustrates wearable augmented reality display devices 28 (e.g., augmented reality glasses, augmented reality goggles, other augmented reality headgear, and so forth), which may include functionality substantially similar to the functionality of the augmented reality display endpoints 26 described herein.

Figure 6:
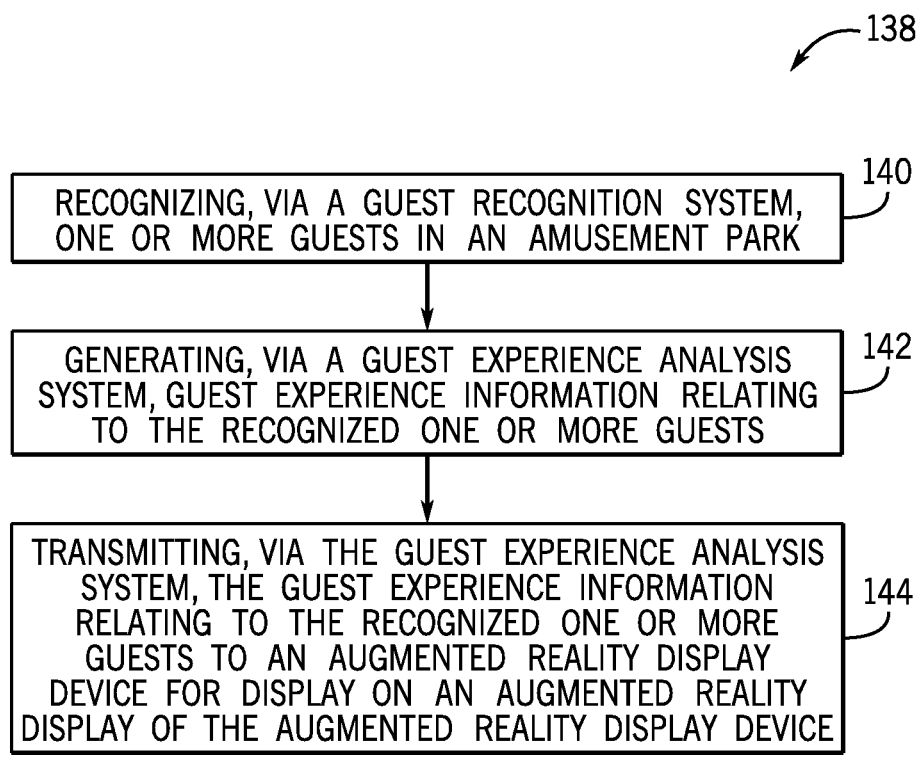
FIG. 6 is a flow diagram of a method of use of the augmented reality guest recognition system, in accordance with embodiments of the present disclosure.

FIG. 6 is a flow diagram of a method 138 of use of the augmented reality guest recognition system 40 described herein. For example, in certain embodiments, the method 138 may include recognizing, via the guest recognition system 22, one or more guests 20 in the venue (block 140). In certain embodiments, recognizing the one or more guests 20 may include utilizing, via the guest recognition system 22, facial recognition algorithms, clothing recognition algorithms, or movement recognition algorithms to detect identities of the one or more guests 20, to detect activity of the one or more guests 20 within the venue 10, or some combination thereof. In addition, in certain embodiments, the method 138 may include generating, via the guest experience analysis system 24, guest experience information 46 (e.g., including recommendations) relating to the recognized one or more guests 20 (block 142). In addition, in certain embodiments, the method 138 may include transmitting, via the guest experience analysis system 24, the guest experience information 46 (e.g., including recommendations) relating to the recognized one or more guests 20 to an augmented reality display device (e.g., one or more augmented reality display endpoints 26 and/or one or more wearable augmented reality display devices 28) for display on an augmented reality display (e.g., displays 48, 50) of the one or more augmented reality display endpoints 26 and/or the one or more wearable augmented reality display devices 28 (block 144).

In certain embodiments, the method 138 may also include identifying, via the guest recognition system 22, one or more groups of guests 20 based at least in part on an amount of time that individual guests 20 of the one or more guests 20 remain in proximity with each other. In such embodiments, the method 138 may also include generating, via the guest experience analysis system 24, guest group experience information 46 (e.g., including recommendations) relating to the identified one or more groups of guests 20, and transmitting, via the guest experience analysis system 24, the guest group experience information 46 (e.g., including recommendations) relating to the identified one or more groups of guests 20 to an augmented reality display device (e.g., one or more augmented reality display endpoints 26 and/or one or more wearable augmented reality display devices 28) for display on an augmented reality display (e.g., displays 48, 50) of the one or more augmented reality display endpoints 26 and/or the one or more wearable augmented reality display devices 28. In addition, in certain embodiments, the method 138 may also include receiving, via the guest experience analysis system 24, modified and/or additional guest experience information 46 (e.g., including recommendations) relating to the recognized one or more guests 20 from one or more augmented reality display endpoints 26 and/or one or more wearable augmented reality display devices 28. In addition, in certain embodiments, the method 138 may also include receiving, via the guest experience analysis system 24, a command from an augmented reality display endpoint 26 or a wearable augmented reality display device 28 to implement one or more physical effects 38 via one or more physical objects 36 disposed within the venue 10, and transmitting, via the guest experience analysis system 24, a control signal to the one or more physical objects 36 to implement the one or more physical effects 38.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A system, comprising:
a guest recognition system configured to recognize a guest in an amusement or theme park and to detect activity of the guest relative to the amusement or theme park; and
a guest experience analysis system configured to receive data relating to the detected activity of the guest from the guest recognition system, to generate guest experience information relating to the guest based at least in part on the received data relating to the detected activity of the guest, and to transmit the guest experience information relating to the guest to an augmented reality display device for display to an operator of the amusement or theme park on an augmented reality display of the augmented reality display device and to enable receipt of one or more input commands from the operator of the amusement or theme park via one or more input devices of the augmented reality display device, wherein the generated guest experience information comprises one or more recommended theme-related experiences for the guest relative to a themed attraction of the amusement or theme park, and wherein the one or more input commands relate to the one or more recommended theme-related experiences for the guest.

2. The system of claim 1, wherein the guest recognition system is configured to utilize facial recognition algorithms, clothing recognition algorithms, or movement recognition algorithms to detect an identity of the guest, to detect the activity of the guest, or some combination thereof.

3. The system of claim 1, wherein the guest recognition system is configured to identify a group of guests based at least in part on an amount of time that individual guests of the group of guests remain in proximity with each other.

4. The system of claim 3, wherein the guest experience analysis system is configured to receive data relating to the group of guests from the guest recognition system, to generate guest group experience information relating to the group of guests based at least in part on the data relating to the group of guests, and to transmit the guest group experience information to the augmented reality display device for display on the augmented reality display of the augmented reality display device.

5. The system of claim 1, wherein the guest experience analysis system is configured to transmit a control signal to one or more physical objects disposed within the amusement or theme park to implement one or more physical effects via the one or more physical objects in response to receiving the one or more input commands.

6. The system of claim 1, wherein the guest experience analysis system is configured to transmit the guest experience information relating to the guest to the augmented reality display device such that the guest experience information relating to the guest may be superimposed on the augmented reality display device near pass-through images of the guest.

7. The system of claim 6, wherein the guest experience analysis system is configured to switch focus on the augmented reality display device from the guest to another guest.

8. The system of claim 1, wherein the guest experience analysis system is configured to utilize the one or more input commands to implement at least a portion of the one or more recommended theme-related experiences for the guest.

9. A method comprising:
recognizing, via a guest recognition system, a guest in an amusement or theme park;
generating, via a guest experience analysis system, guest experience information relating to the guest;
generating, via the guest experience analysis system, one or more recommendations relating to one or more recommended theme-related experiences for the guest relative to a themed attraction of the amusement or theme park based at least in part on the guest experience information relating to the guest;
transmitting, via the guest experience analysis system, the one or more recommendations relating to one or more recommended theme-related experiences for the guest relative to the themed attraction of the amusement or theme park to an augmented reality display device for display to an operator of the amusement or theme park on an augmented reality display of the augmented reality display device; and
receiving, via the guest experience analysis system, one or more input commands from the operator of the amusement or theme park via one or more input devices of the augmented reality display device, wherein the one or more input commands relate to the one or more recommended theme-related experiences for the guest.

10. The method of claim 9, comprising utilizing, via the guest recognition system, facial recognition algorithms, clothing recognition algorithms, or movement recognition algorithms to detect an identity of the guest, to detect activity of the guest, or some combination thereof.

11. The method of claim 9, comprising identifying, via the guest recognition system, a group of guests based at least in part on an amount of time that individual guests of the group of guests remain in proximity with each other.

12. The method of claim 11, comprising:
generating, via the guest experience analysis system, guest group experience information relating to the group of guests;
generating, via the guest experience analysis system, one or more group recommendations for the group of guests based at least in part on the guest group experience information relating to the group of guests; and
transmitting, via the guest experience analysis system, the one or more group recommendations for the group of guests to the augmented reality display device for display on the augmented reality display of the augmented reality display device.

13. The method of claim 9, comprising:
transmitting, via the guest experience analysis system, a control signal to one or more physical objects disposed within the amusement or theme park to implement one or more physical effects via the one or more physical objects in response to receiving the one or more input commands.

14. The method of claim 9, comprising superimposing the one or more recommendations relating to one or more recommended theme-related experiences for the guest relative to the themed attraction of the amusement or theme park on the augmented reality display device near pass-through images of the guest.

15. The method of claim 9, comprising utilizing the one or more input commands to implement at least a portion of the one or more recommended theme-related experiences for the guest.

16. An augmented reality display device, comprising:
an augmented reality display configured to pass-through images of one or more guests of an amusement or theme park; and
one or more non-transitory, computer-readable media storing instructions which, when executed by at least one processor, cause the at least one processor to perform operations comprising:
receiving guest experience information relating to activity of a targeted guest of the one or more guests relative to the amusement or theme park from a guest experience analysis system, wherein the guest experience information comprises one or more recommended theme-related experiences for the targeted guest of the one or more guests relative to a themed attraction of the amusement or theme park, wherein the one or more recommended theme-related experiences for the targeted guest are generated by the guest experience analysis system;
superimposing at least one recommended theme-related experience of the one or more recommended theme-related experiences for the targeted guest on the augmented reality display near pass-through images of the targeted guest; and
receiving one or more input commands via one or more input devices of the augmented reality display device, wherein the one or more input commands relate to the one or more recommended theme-related experiences for the targeted guest.

17. The augmented reality display device of claim 16, wherein the operations comprise:
receiving guest group experience information relating to a targeted group of the one or more guests from the guest experience analysis system, wherein the guest group experience information comprises one or more recommended theme-related experiences for the targeted group of the one or more guests, wherein the one or more recommended theme-related experiences for the targeted group are generated by the guest experience analysis system; and superimposing at least one recommended experience of the one or more recommended theme-related experiences for the targeted group or more guests on the augmented reality display near pass-through images of the targeted group of the one or more guests.

18. The augmented reality display device of claim 16, wherein the operations comprise transmitting a control signal to one or more physical objects disposed within the amusement or theme park to implement one or more physical effects via the one or more physical objects in response to receiving the one or more input commands.

19. The augmented reality display device of claim 16, comprising an input device configured to receive a command to switch focus from the targeted guest of the one or more guests to another targeted guest of the one or more guests.

20. The augmented reality display device of claim 16, wherein the augmented reality display device comprises a stationary augmented reality display endpoint disposed within the amusement or theme park.

21. The augmented reality display device of claim 16, wherein the augmented reality display device comprises augmented reality glasses, augmented reality goggles, or other augmented reality headgear.

22. The augmented reality display device of claim 16, wherein the operations comprise utilizing the one or more input commands to implement at least a portion of the one or more recommended theme-related experiences for the targeted guest.

* * * * *